(12) United States Patent
Yang (10) Patent No.: US 11,413,949 B2
(45) Date of Patent: Aug. 16, 2022

(54) DUAL-MOTOR DIFFERENTIAL DRIVE SYSTEM

(71) Applicants: Ying-Chung Yang, Taoyuan (TW); U-Tech Media Corporation, Taoyuan (TW)

(72) Inventor: Ying-Chung Yang, Taoyuan (TW)

(73) Assignees: Ying-Chung Yang, Taoyuan (TW); U-Tech Media Corporation, Taoyuan (TW)

(*) Notice: Subject to any disclaimer, the term of this patent is extended or adjusted under 35 U.S.C. 154(b) by 145 days.

(21) Appl. No.: 16/952,096

(22) Filed: Nov. 19, 2020

(65) Prior Publication Data

US 2022/0153109 A1 May 19, 2022

(51) Int. Cl.
*B60K 1/02* (2006.01)
*B60K 17/16* (2006.01)
*B62M 23/02* (2010.01)
*B62M 6/70* (2010.01)
*F16H 7/02* (2006.01)

(52) U.S. Cl.
CPC ............. *B60K 1/02* (2013.01); *B60K 17/16* (2013.01); *F16H 7/02* (2013.01)

(58) Field of Classification Search
CPC . B60K 1/02; B60K 17/16; F16H 7/02; B62M 23/02; B62M 6/45; B62M 6/40; B62M 6/70
See application file for complete search history.

(56) References Cited

U.S. PATENT DOCUMENTS

| | | | |
|---|---|---|---|
| 8,246,502 B2 | 8/2012 | Esplin et al. | |
| 8,919,479 B1* | 12/2014 | Langlands | B62M 11/04 180/219 |
| 9,457,658 B2* | 10/2016 | Knoblauch | B60L 15/2036 |
| 2006/0030454 A1* | 2/2006 | Uchisasai | B60W 20/30 477/77 |
| 2015/0135863 A1 | 5/2015 | Dalum | |
| 2015/0251563 A1* | 9/2015 | Shirokura | G05D 1/0891 701/22 |
| 2016/0137045 A1 | 5/2016 | Zhu et al. | |

FOREIGN PATENT DOCUMENTS

| | | |
|---|---|---|
| CN | 2478837 | 2/2002 |
| CN | 102152737 | 8/2011 |
| CN | 104822978 | 8/2015 |

(Continued)

*Primary Examiner* — Tinh Dang
(74) *Attorney, Agent, or Firm* — JCIPRNET (57) ABSTRACT

A dual-motor differential drive system, including a main wheel, a drive wheel, a differential unit, a first motor, a second motor, and at least one drive unit, is provided. The main wheel has a central shaft. The drive wheel is disposed on the main wheel. The differential unit is disposed on a side of the drive wheel and aligned with the drive wheel. The first motor and the second motor respectively have a first shaft and a second shaft, and are connected to the differential unit. The at least one drive unit is disposed on the differential unit and the drive wheel. The first motor and the second motor are adapted to run in same or reverse direction to respectively drive the differential unit to rotate. The differential unit drives the drive wheel through the at least one drive unit, enabling the main wheel to pivot through the central shaft.

14 Claims, 9 Drawing Sheets

(56) References Cited

FOREIGN PATENT DOCUMENTS

| | | |
|---|---|---|
| CN | 108474459 | 8/2018 |
| TW | M462205 | 9/2013 |
| TW | 201343467 | 11/2013 |
| TW | I523771 | 3/2016 |

\* cited by examiner

DUAL-MOTOR DIFFERENTIAL DRIVE SYSTEM

BACKGROUND

Technical Field

This disclosure relates to a differential drive system, and in particular to a dual-motor differential drive system that is applicable to electric vehicles.

Description of Related Art

Most of the existing electric locomotives use a single motor or double motors. In order to achieve the best working efficiency of the motor, a gearbox is required to adjust the best rotational speed of the motor. With the increase in power demand, the electric control system has to use high-power components, causing the manufacturing cost of the drive system to increase. In addition, the usage of the gearbox increases the complexity of the drive mechanism and also increases the frictional work consumption between the gears. The existing single-motor drive system requires the usage of a water cooling device, which leads to high cost and high power consumption in the single-motor drive system.

Nowadays, a dual-motor drive system has also been developed to improve the issue of heat generation. However, the existing dual-motor drive system requires the usage of two driving motors with similar output performance, or respectively adjusts the power ratio between the two motors to prevent the dual motors from restricting each other and limiting their output performance. If a ratchet wheel or a variable speed gear set is used to match the rotational speed and torque of the dual motors, it also leads to high cost and high power consumption.

SUMMARY

This disclosure provides a dual-motor differential drive system, which connects the dual motors through differential wheels, enabling the dual motors to not interfere with each other during operation. Therefore, the dual motors with different rotational speeds and powers can be combined to reduce heat generation and power consumption.

A dual-motor differential drive system of the disclosure includes a main wheel, a drive wheel, a differential unit, a first motor, a second motor, and at least one drive unit. The main wheel has a central shaft extending in an axial direction. The drive wheel is disposed on the main wheel. The differential unit is disposed on a side of the drive wheel and is aligned with the drive wheel. The first motor has a first shaft and is connected to the differential unit. The second motor has a second shaft and is connected to the differential unit. The at least one drive unit is disposed on the differential unit and the drive wheel. The first motor and the second motor are adapted to run in reverse direction or run in same direction to respectively drive the differential unit to rotate. The differential unit drives the drive wheel through the at least one drive unit, to enable the main wheel to pivot through the central shaft.

The dual-motor differential drive system of the disclosure includes a main wheel, two drive wheels, a differential unit, a first motor, a second motor, and two drive units. The main wheel has two central shafts extending in an axial direction. The two drive wheels are respectively disposed on the two central shafts. The differential unit is disposed inside the main wheel. The first motor and the second motor are in a parallel two-layer disposition. The two drive units are respectively connected to the two drive wheels, and the first motor and the second motor. The first motor and the second motor are adapted to run in reverse direction to respectively drive the two drive wheels through the two drive units, thereby driving the differential unit to rotate, to enable the main wheel to pivot through the two central shafts.

Based on the above, the dual-motor differential drive system of the disclosure connects the first motor and the second motor through the differential unit, therefore the first motor and the second motor can use the different rotational speeds and power specifications, enabling the first motor and the second motor to operate at their own powers without interfering with each other, and the total output power of the system is close to the sum of the power of the first motor and the power of the second motor. Furthermore, the dual-motor differential drive system of the disclosure replaces the gearbox with the differential unit, enabling the manufacturing cost to be greatly reduced and the power consumption during operation to be reduced. Replacing operation by the existing single motor with the dual-motor can also reduce overheating common during the operation of a single motor.

To make the aforementioned more comprehensible, several embodiments accompanied by drawings are described in detail as follows.

DESCRIPTION OF THE EMBODIMENTS

Figure 1A:
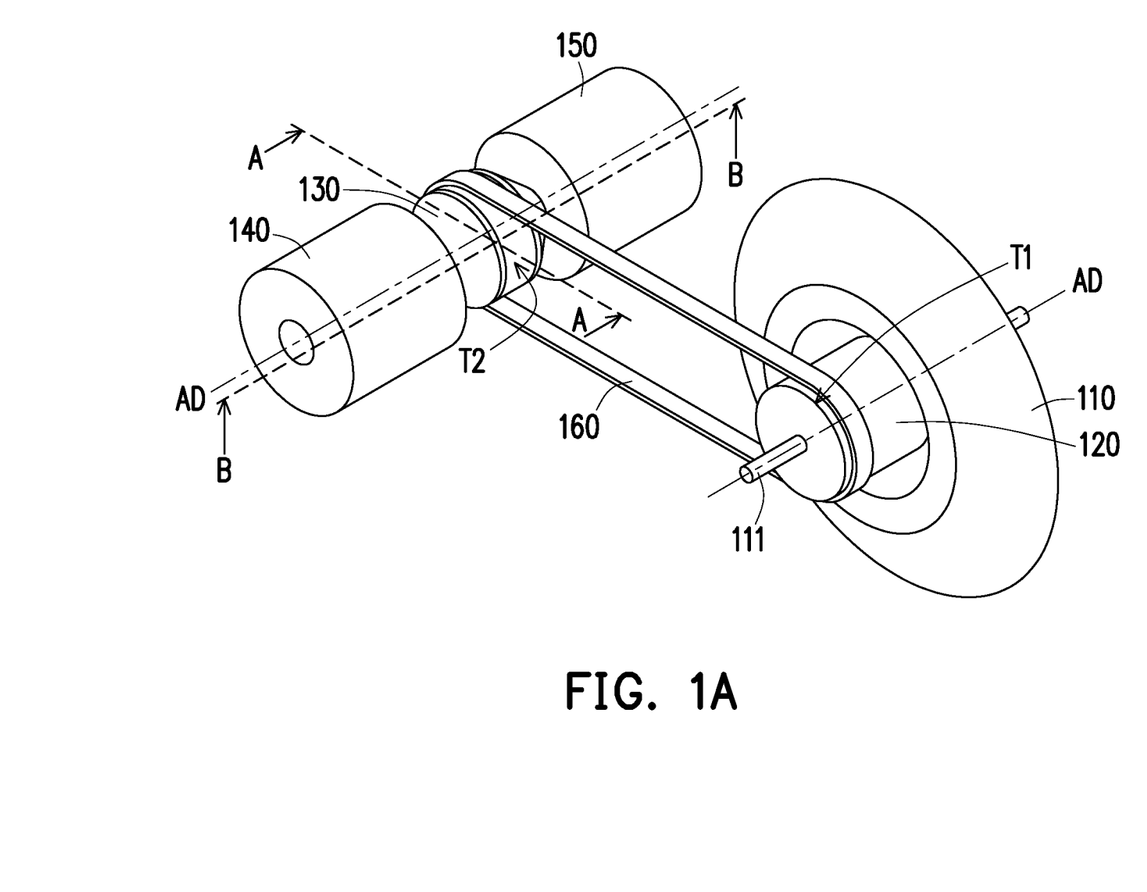
FIG. 1A is a perspective schematic view of a dual-motor differential drive system according to an embodiment of the disclosure.
Figure 1B:
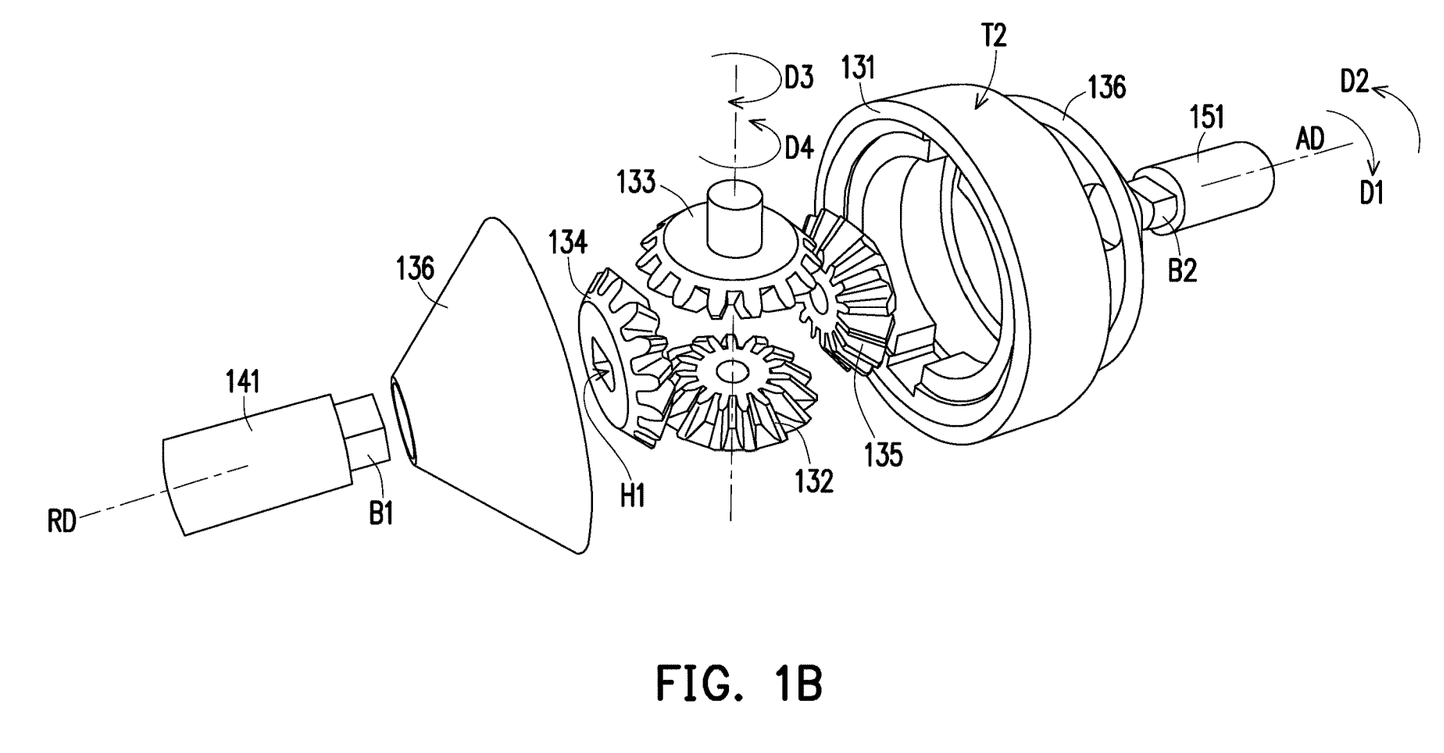
FIG. 1B is an exploded schematic view of some components of the dual-motor differential drive system in FIG. 1A.
Figure 1C:
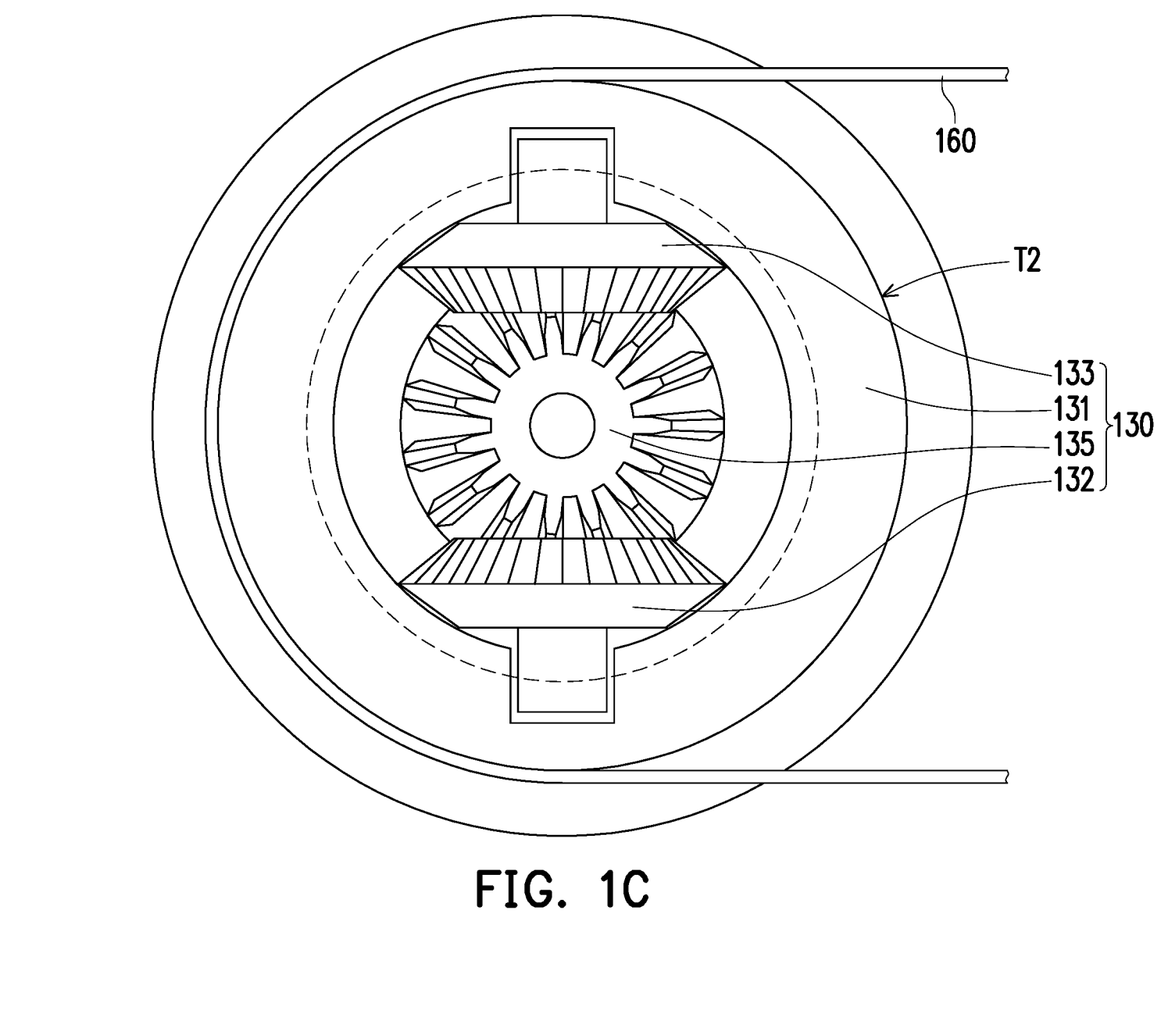
FIG. 1C is a schematic cross-sectional view of the dual-motor differential drive system in FIG. 1A along the A-A line.
Figure 1D:
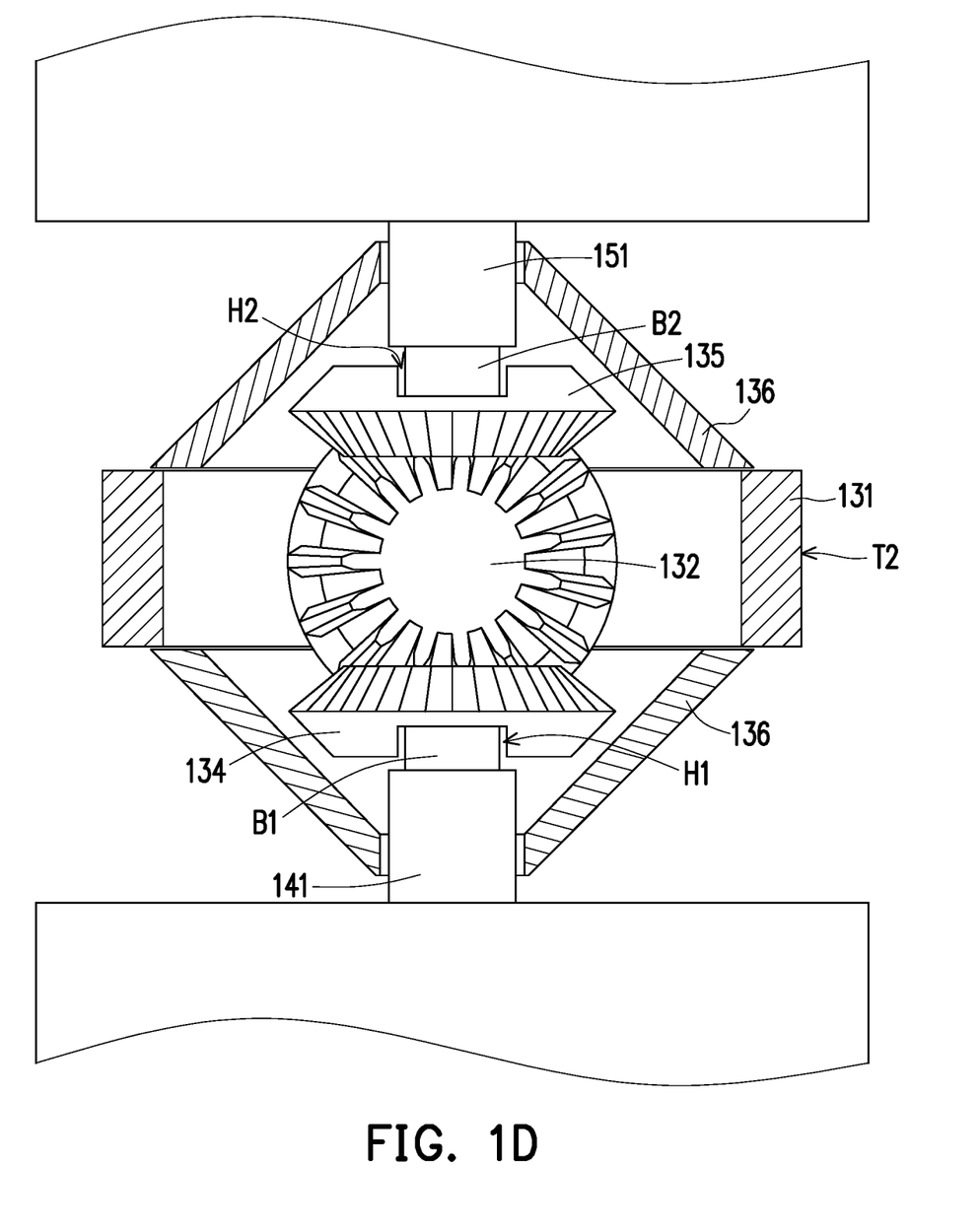
FIG. 1D is a schematic cross-sectional view of the dual-motor differential drive system in FIG. 1A along the B-B line.

FIG. 1A is a perspective schematic view of a dual-motor differential drive system according to an embodiment of the disclosure. FIG. 1B is an exploded schematic view of some components of the dual-motor differential drive system in FIG. 1A. FIG. 1C is a schematic cross-sectional view of the dual-motor differential drive system in FIG. 1A along the A-A line. FIG. 1D is a schematic cross-sectional view of the dual-motor differential drive system in FIG. 1A along the B-B line.

With reference to FIG. 1A, the dual-motor differential drive system of the disclosure is, for example, applied to a two-wheeled electric car. A main wheel shown in FIG. 1A may be a front wheel of the electric car or a rear wheel of the electric car, but the disclosure is not limited thereto.

With reference to FIGS. 1A to 1D, a dual-motor differential drive system 100 of the disclosure includes a main wheel 110, a drive wheel 120, a differential unit 130, a first motor 140, a second motor 150, and at least one drive unit 160.

The main wheel 110 is, for example, a tire of an electric motor vehicle and is adapted to be in contact with the ground. The main wheel 110 has a central shaft 111 extending in an axial direction AD. The drive wheel 120 is disposed on the main wheel 110. In detail, the drive wheel 120 is disposed on the central shaft 111 and is located in the main wheel 110. One end of the drive wheel 120 protrudes outside the main wheel 110 in the axial direction AD and surrounds to form an outer ring surface T1.

The differential unit 130 is disposed on one side of the drive wheel 120 and is aligned with the drive wheel 120. In detail, the differential unit 130 is located on one side of the main wheel 110 and is connected to the end of the drive wheel 120 protruding from the main wheel 110 in a straight line.

In other embodiments, the differential unit may also be replaced as a limited slip differential. When the limited slip differential is use, the main wheel may still be driven by the other motor that is operating normally even if a single motor or controller fails.

The first motor 140 has a first shaft 141 and is connected to the differential unit 130. The second motor 150 has a second shaft 151 and is connected to the differential unit 130. The first shaft 141 and the second shaft 151 are respectively connected to two sides of the differential unit 130 to enable the differential unit 130 to be driven separately. In addition, the first motor 140 and the second motor 150 are, for example, motors of the same performance specifications or motors of different performance specifications.

The at least one drive unit 160 (shown as a single unit in FIG. 1A) is disposed on the differential unit 130 and the drive wheel 120 to serve as a medium for transmitting the motor power. The drive wheel 120 and the main wheel 110 are simultaneously driven through the drive unit 160 when the differential unit 130 is driven by the first motor 140 and the second motor 150.

In the embodiment, the first motor 140 and the second motor 150 are located on two opposite sides of the differential unit 130 in the axial direction AD. This shows that the first motor 140 and the second motor 150 are disposed opposite to each other and are adapted to run in reverse direction (that is, one of the motors turns in a clockwise direction and the other motor turns in an counterclockwise direction) to respectively drive the differential unit 130 to rotate, and the differential unit 130 drives the drive wheel 120 through friction between the drive unit 160 and the outer ring surface T1, to enable the main wheel 110 to pivot through the central shaft 111.

With reference to FIGS. 1B to 1D, the differential unit 130 includes a driving wheel 131, a first driven gear 132, a second driven gear 133, a first driving gear 134, a second driving gear 135, and two housings 136 with a cone-shape appearance as shown.

The driving wheel 131 has an outer ring surface T2, and the outer ring surface T2 of the driving wheel 131 is aligned with the outer ring surface T1 of the drive wheel 120. The drive unit 160 is, for example, a belt and is sleeved on the outer ring surface T2 of the driving wheel 131 and the outer ring surface T1 of the drive wheel 120. In the embodiment, both the driving wheel 131 and the drive wheel 120 are belt pulleys, and the drive unit 160 is a belt.

In other embodiments, the driving wheel and the drive wheel are both sprockets, and the drive unit is, for example, a chain.

The first driven gear 132 and the second driven gear 133 are pivotally connected to an inner wall surface of the driving wheel 131 and are located in a radial direction RD of the driving wheel 131. The first driving gear 134 and the second driving gear 135 are rotatably disposed in the axial direction AD of the driving wheel 131 and are respectively engaged with the first driving gear 132 and the second driving gear 133. The two housings 136 are disposed on two sides of the driving wheel 131, and are configured to accommodate the first driven gear 132, the second driven gear 133, the first driving gear 134, and the second driving gear 135.

With reference to FIGS. 1A to 1D, the first shaft 141 of the first motor 140 penetrates one of the housings 136 to connect to the first driving gear 134. In addition, an end of the first shaft 141 has a first engaging portion B1, and the first driving gear 134 has a first engaging hole H1. The first engaging portion B1 is engaged with the first engaging hole H1, to enable the first shaft 141 to be connected to the first driving gear 134 as one.

The second shaft 151 of the second motor 150 penetrates the other housing 136 to connect to the second driving gear 135. In addition, an end of the second shaft 151 has a second engaging portion B2, and the second driving gear 135 has a second engaging hole H2. The second engaging portion B2 is engaged with the second engaging hole H2, to enable the second shaft 151 to be connected to the second driving gear 135 as one.

The first shaft 141 and the second shaft 151 respectively drive the first driving gear 134 and the second driving gear 135 to be adapted to rotate toward a first direction D1 or a second direction D2 when the first motor 140 and the second motor 150 are running in the reverse direction (that is, one motor is turning in the clockwise direction and the other motor is turning in the counterclockwise direction). In this case, a pivoting direction D3 of the first driven gear 132 is opposite to a pivoting direction D4 of the second driven gear 133, therefore they cancel out each other, enabling the first driven gear 132 and the second driven gear 133 to be stationary. The driving gear 134 and the second driving gear 135 then respectively apply torque to the driving wheel 131 through the first driven gear 132 and the second driven gear 133 to drive the driving wheel 131 to rotate toward the first direction D1 or the second direction D2.

Furthermore, the first motor 140 and the second motor 150 of the disclosure respectively drive the drive wheel 131 by the different driving gears 134 and 135 and the different driven gears 132 and 133, and have the characteristic of not interfering with each other. Therefore, the first motor 140 and the second motor 150 may be respectively disposed as the motors with different rotational speeds and powers, enabling the first motor 140 and the second motor 150 to operate at their own powers without the need for a gearbox to adjust the rotational speed. In addition, the disclosure may control the power output of the motor by adjusting input size of the current through an external controller.

The formula for calculating the power of the motor is as follows:

Power=Rotational speed $V$*Torque $T$*0.1047 (constant).

The first motor 140 and the second motor 150 output power through the differential unit 130. Using the characteristics of the differential unit 130, assume that the first motor 140 runs in the clockwise direction and the rotational speed is V1, and the second motor 150 runs in the counterclockwise direction and the rotational speed is V2, then a rotational speed finally outputted by the differential unit 130 is (V1+V2)/2, the torque is T1+T2, and the total output power is (V1+V2)/2*(T1+T2)*0.1047.

In other embodiments, the first motor 140 and the second motor 150 use the motors of the same specification, then the output power of the differential unit 130 is 2VN*0.1047, which is twice that of the single motor.

Furthermore, the at least one drive unit 160 of the embodiment is, for example, a chain, and both the driving wheel 131 and the drive wheel 120 are sprockets. In actual implementation, the drive unit 160 is, for example, a chain and is sleeved and engaged with the peripheries of the driving wheel 131 and the drive wheel 120.

Figure 2A:
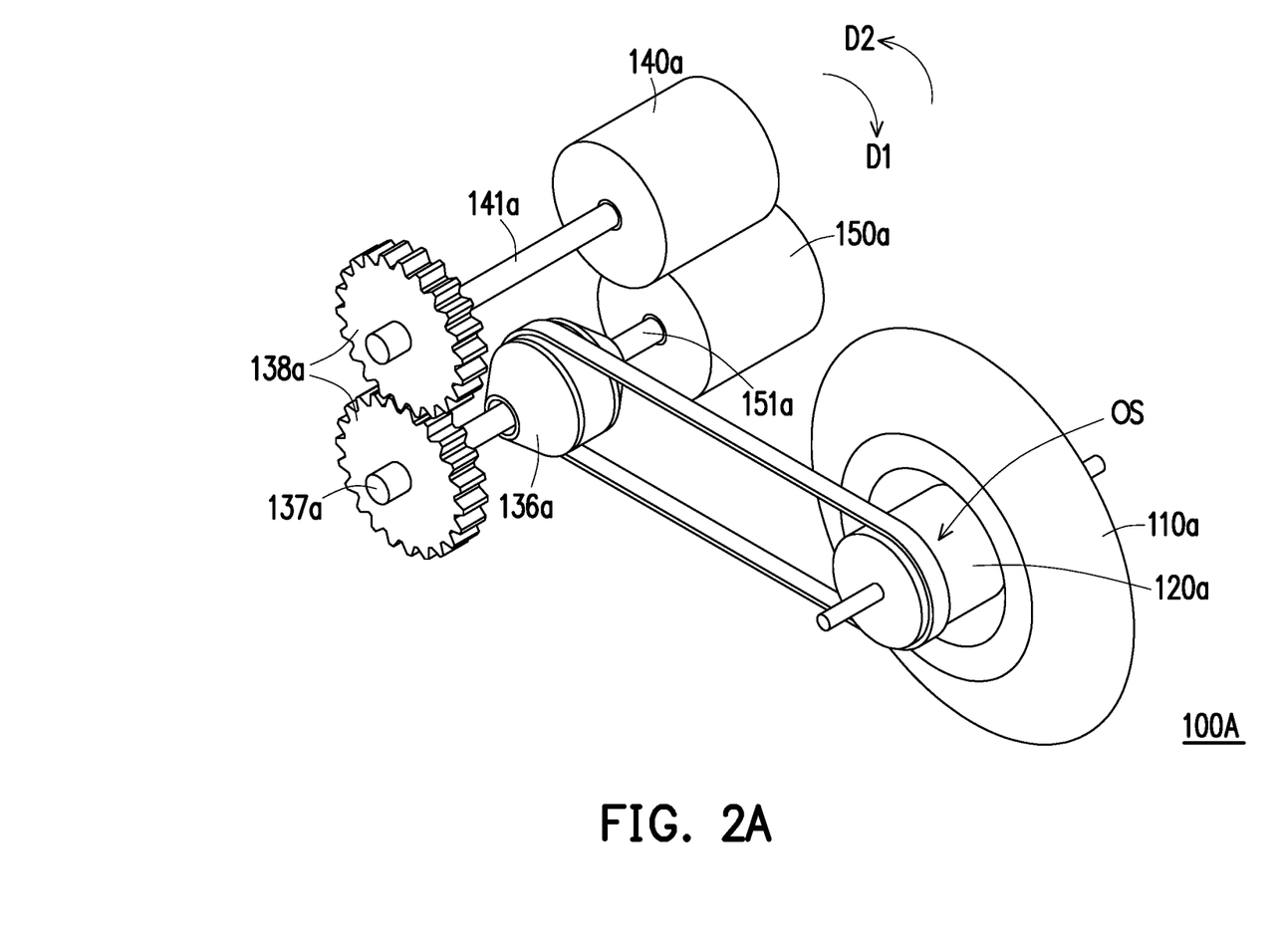
FIG. 2A is a perspective schematic view of a dual-motor differential drive system according to another embodiment of the disclosure.

FIG. 2A is a perspective schematic view of a dual-motor differential drive system according to another embodiment of the disclosure.

With reference to FIGS. 2A and 1B, a dual-motor differential drive system 100A of the embodiment is similar to the dual-motor differential drive system 100 shown in FIG. 1A, except that a drive wheel 120a is disposed an outer wall surface OS of the main wheel 110a and surrounds the periphery of a central shaft 111a. A first motor 140a and a second motor 150a are disposed on the same side of a differential unit 130a (for example, the left side or the right side), and the first motor 140a and the second motor 150a are stacked on top of each other.

A third shaft 137a penetrates one of housings 136a to connect to a first driving gear 134a, a second shaft 151a of the second motor 150a penetrates the other of the housings 136a to connect to a second driving gear 135a, and a first shaft 141a is disposed parallel to and below the third shaft 137a and the second shaft 151a. Two interlocking gears 138a are respectively fixedly sleeved on the third shaft 137a and the first shaft 141a, and are engaged with each other.

The first shaft 141a the third shaft 137a through the two interlocking gears 138a and the second shaft 151a drives the second driving gear 135a when the first motor 140a and the second motor 150a are running in the reverse direction (that is, one motor is turning in the clockwise direction and the other motor is turning in the counterclockwise direction), enabling the differential unit 130a to be adapted to rotate toward the first direction D1 or the second direction D2.

Figure 2B:
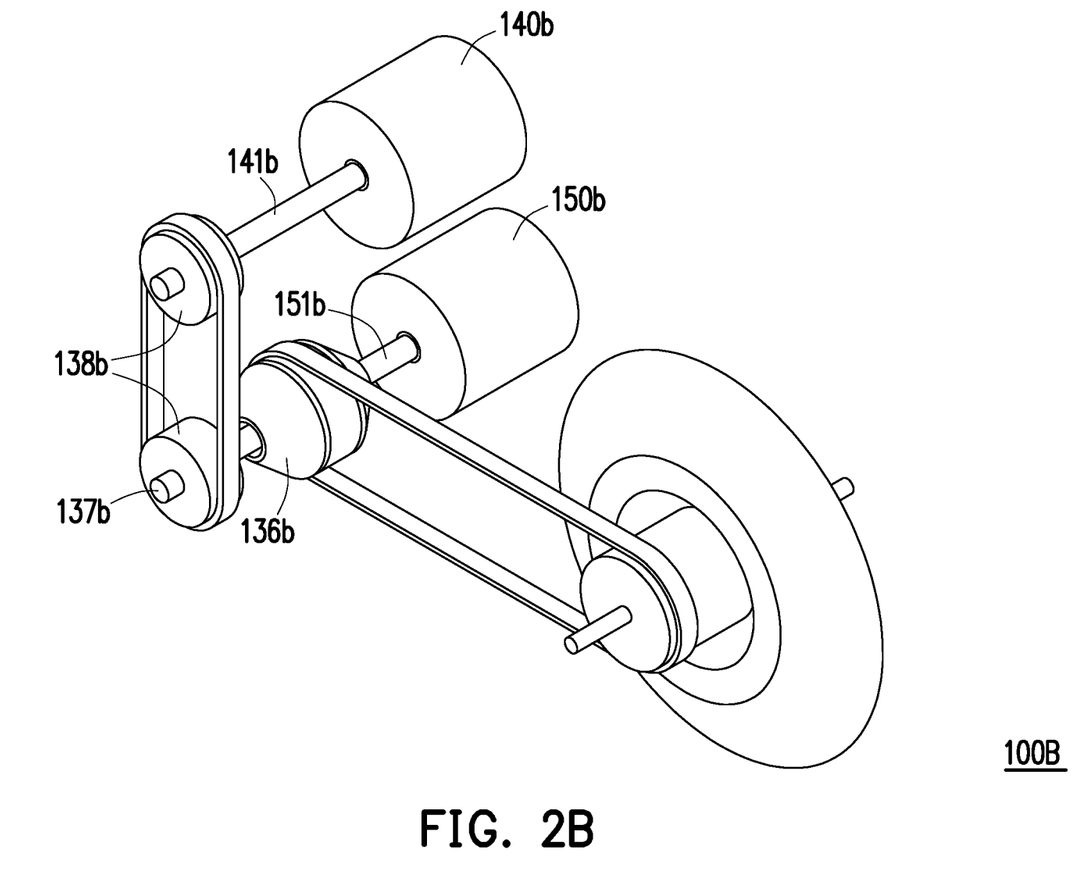
FIG. 2B is a perspective schematic view of a dual-motor differential drive system according to yet another embodiment of the disclosure.

FIG. 2B is a perspective schematic view of a dual-motor differential drive system according to yet another embodiment of the disclosure.

With reference to FIGS. 2B and 1B, a dual-motor differential drive system 100B of the embodiment is similar to the dual-motor differential drive system 100A shown in FIG. 2A, except that a third shaft 137b penetrates one of housings 136b to connect to the first driving gear, a second shaft 151b of a second motor 150b penetrates the other of the housings 136b to connect to the second driving gear. A first shaft 141b is disposed parallel to and above the third shaft 137b and the second shaft 151b. Two belt pulleys 138b are respectively fixedly sleeved on the third shaft 137b and the first shaft 141b, and a differential unit 130b further includes a belt, respectively sleeved on the two belt pulleys 138b.

Figure 2C:
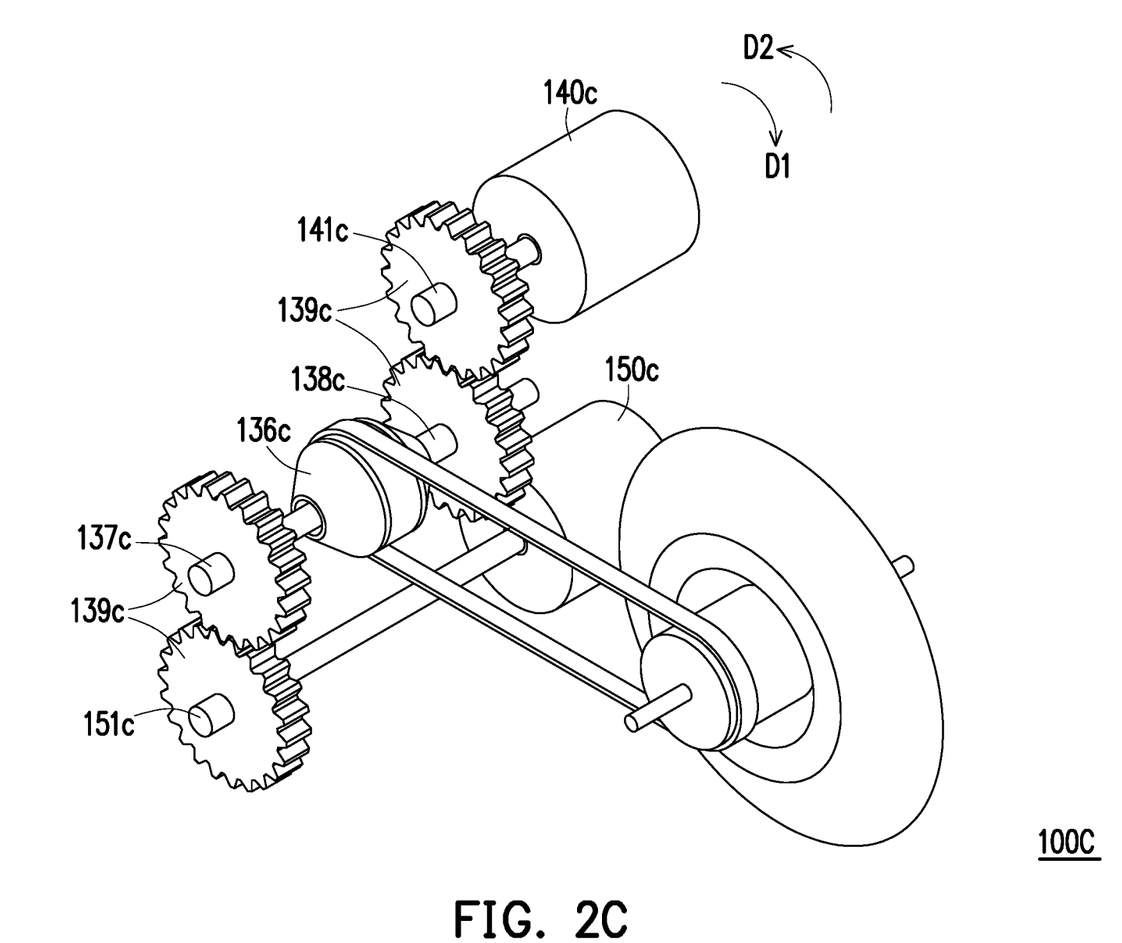
FIG. 2C is a perspective schematic diagram of a dual-motor differential drive system according to still another embodiment of the disclosure.

FIG. 2C is a perspective schematic diagram of a dual-motor differential drive system according to still another embodiment of the disclosure.

With reference to FIGS. 2C and 1B, a dual-motor differential drive system 100C of the embodiment is similar to the dual-motor differential drive system 100A shown in FIG. 2A, except that a third shaft 137c penetrates one of housings 136c to connect to the first driving gear, and a fourth shaft 138c penetrates the other of the housings 136c to connect to the second driving gear. A first shaft 141c is disposed parallel to and above the fourth shaft 138c, and a second shaft 151c is disposed parallel to and below the third shaft 137c and the fourth shaft 138c. Four interlocking gears 139c are respectively fixedly sleeved on the first shaft 141c, the second shaft 151c, the third shaft 137c, and the fourth shaft 138c and the gears are engaged in pairs with each other.

Specifically, the interlocking gear 139c on the first shaft 141c is engaged with the interlocking gear 139c on the fourth shaft 138c, and the interlocking gear 139c on the second shaft 151c is engaged with the interlocking gear 139c on the third shaft 137c. In the embodiment, the first shaft 141c drives the fourth shaft 138c through the two interlocking gears 139c and the second shaft 151c drives the third shaft 137c through the two interlocking gears 139c when the first motor 140c and the second motor 150c run in the same direction (that is, both of the motors are turning in the clockwise or the counterclockwise direction), enabling a differential unit 130c to be adapted to rotate towards the first direction D1 or the second direction D2.

Figure 3A:
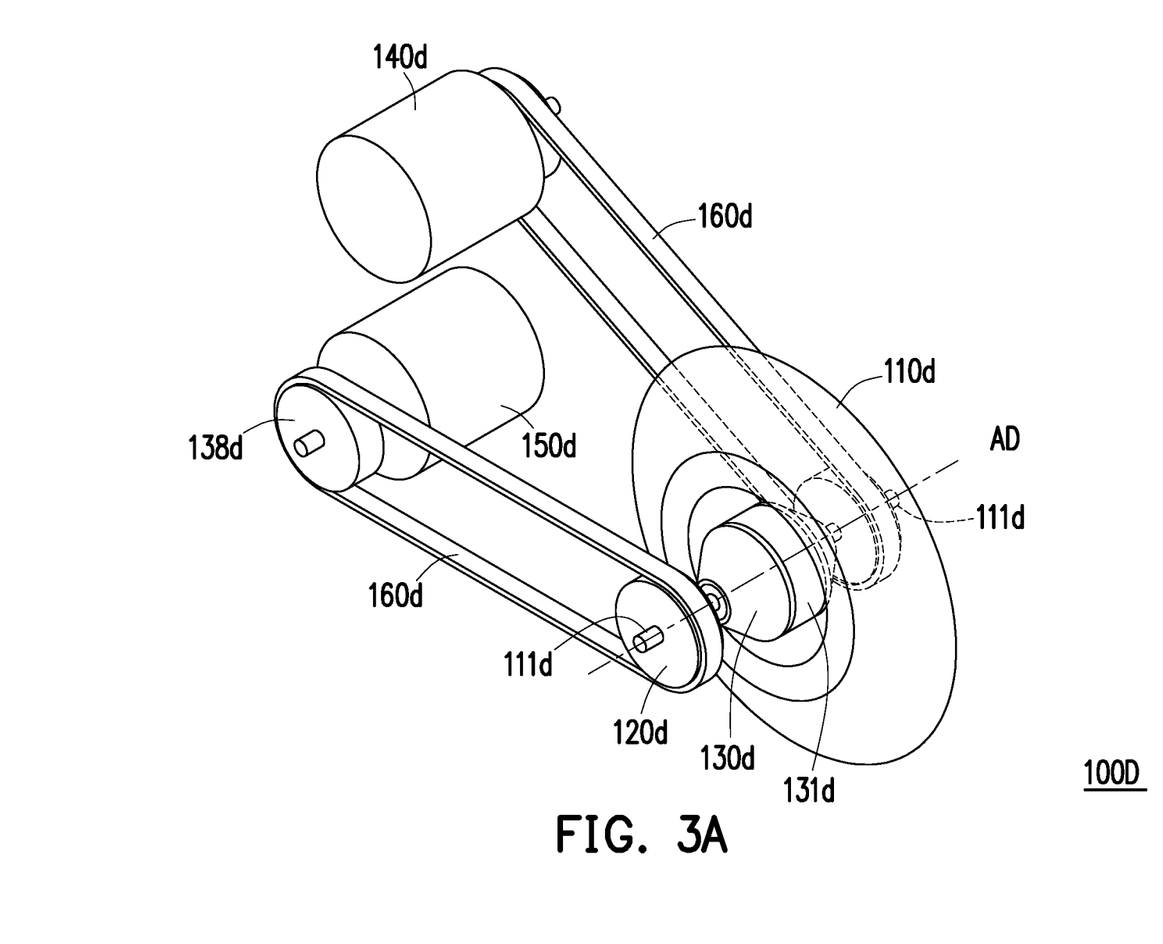
FIG. 3A is a perspective schematic view of a dual-motor differential drive system according to yet still another embodiment of the disclosure.
Figure 3B:
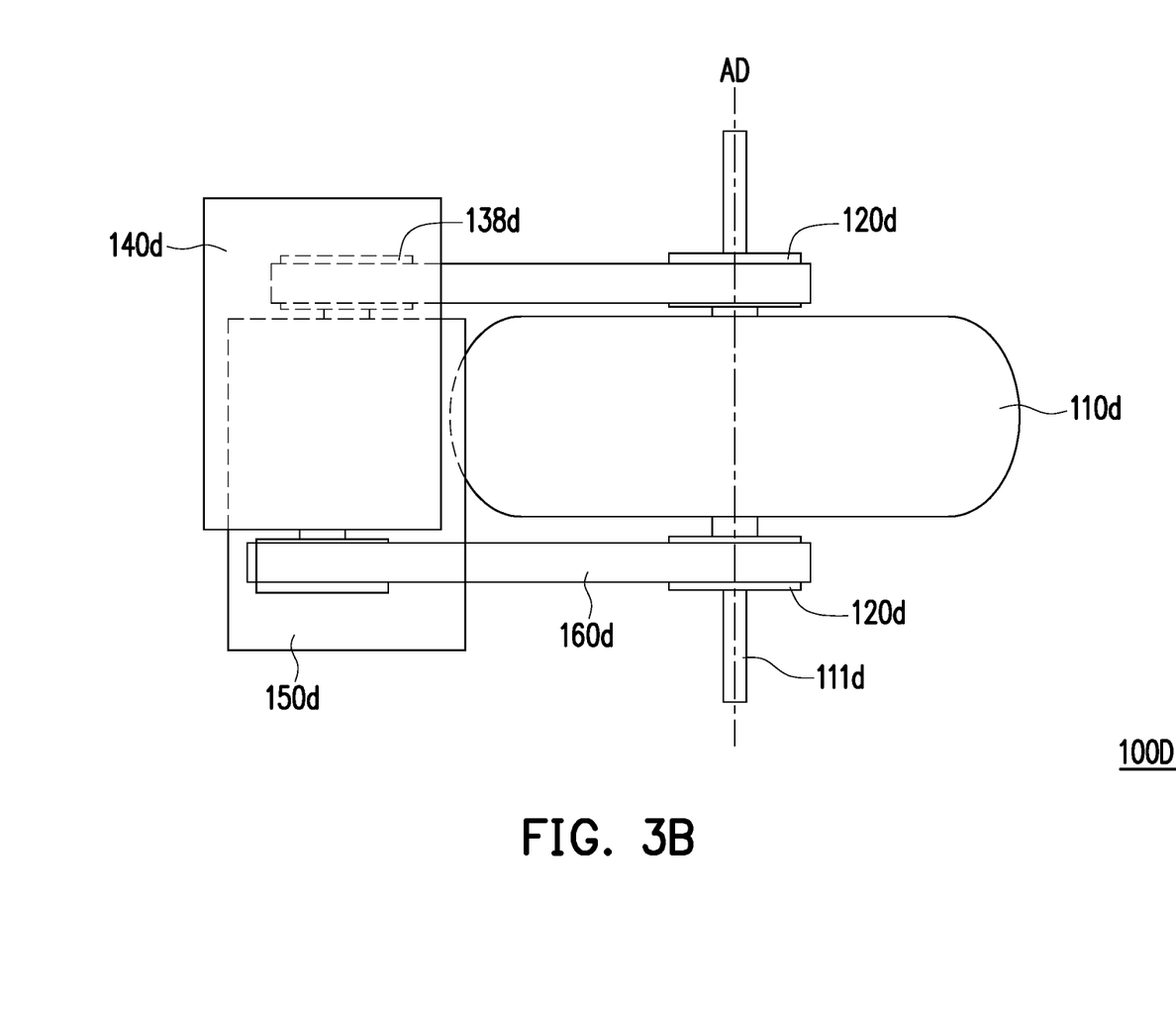
FIG. 3B is a schematic plan view of the dual-motor differential drive system in FIG. 3A.

FIG. 3A is a perspective schematic view of a dual-motor differential drive system according to yet still another embodiment of the disclosure. FIG. 3B is a schematic plan view of the dual-motor differential drive system in FIG. 3A.

A dual-motor differential drive system 100D of the embodiment is similar to the dual-motor differential drive system 100 shown in FIG. 1A, except that the dual-motor differential drive system 100D of the disclosure includes a main wheel 110d, two drive wheels 120d, a differential unit 130d, a first motor 140d and a second motor 150d, and two drive units 160d.

The main wheel 110d has two central shafts 111d extending in the axial direction AD. The two central shafts 111d operate independently. The two drive wheels 120d are respectively disposed on the two central shafts 111d and are respectively located on two opposite sides of the main wheel 110d.

The differential unit 130d is disposed inside the main wheel 110d, and a driving wheel 131d of the differential unit 130d is connected to the main wheel 110d as one. The first motor 140d and the second motor 150d are in a parallel two-layer disposition and located on one side of the main wheel 110d. The two drive units 160d are, for example, two belts.

Two belt pulleys 138d are respectively disposed on a first shaft 141d of the first motor 140d and a second shaft 151d of the second motor 150d. Each of the drive units 160d is sleeved on each of the drive wheels 120d and each of the belt pulleys 138d. In this way, the first motor 140d and the second motor 150d may respectively drive the differential unit 130d to pivot through the two drive units 160d.

The first motor 140d and the second motor 150d are adapted to run in the reverse direction to respectively drive the two drive wheels 120d through the two drive units 160d, thereby driving the differential unit 130*d* to rotate, to enable the main wheel 110*d* to pivot through the two central shafts 111*d*.

In the embodiment, the differential unit is connected to the main wheel as one to increase an overlapping range between the first motor and the second motor, thereby reducing the overall structural size of the dual-motor differential drive system.

In summary, the dual-motor differential drive system of the disclosure connects the first motor and the second motor through the differential unit, therefore the first motor and the second motor may use the different rotational speeds and power specifications to enable the first motor and the second motor to operate at their own powers without interfering each other, and the total output power of the system is close to the sum of the power of the first motor and the power of the second motor. Furthermore, the dual-motor differential drive system of the disclosure replaces the gearbox with the differential unit, enabling the manufacturing cost to be greatly reduced and the power consumption during operation to be reduced. Replacing operation by the existing single motor with the dual-motor can also reduce overheating common during the operation of a single motor.

Although the disclosure has been disclosed with the foregoing exemplary embodiments, it is not intended to limit the disclosure. Any person skilled in the art can make various changes and modifications within the spirit and scope of the disclosure. Accordingly, the scope of the disclosure is defined by the claims appended hereto and their equivalents.

What is claimed is:

1. A dual-motor differential drive system, comprising:
   a main wheel, having a central shaft extending in an axial direction;
   a drive wheel, disposed on the main wheel;
   a differential unit, disposed on one side of the drive wheel and aligned with the drive wheel;
   a first motor, having a first shaft and connected to the differential unit;
   a second motor, having a second shaft and connected to the differential unit; and
   at least one drive unit, disposed on the differential unit and the drive wheel,
   wherein the first motor and the second motor are adapted to run in reverse direction or run in same direction to respectively drive the differential unit to rotate, and the differential unit drives the drive wheel through the at least one drive unit, to enable the main wheel to pivot through the central shaft.

2. The dual-motor differential drive system according to claim 1, wherein the differential unit comprises:
   a driving wheel that is aligned with the drive wheel, and the at least one drive unit is sleeved on the driving wheel and the drive wheel;
   a first driven gear and a second driven gear that are pivotally connected to inside of the driving wheel and located on a radial direction of the driving wheel,
   a first driving gear and a second driving gear that are rotatably disposed on an axial direction of the driving wheel and respectively engaged with the first driven gear and the second driven gear; and
   two housings that are disposed on two sides of the driving wheel and configured to accommodate the first driven gear, the second driven gear, the first driving gear and the second driving gear.

3. The dual-motor differential drive system according to claim 2, wherein the first motor and the second motor are located on two opposite sides of the differential unit in the axial direction.

4. The dual-motor differential drive system according to claim 3, wherein the first shaft of the first motor penetrates one of the housings to connect to the first driving gear, the second shaft of the second motor penetrates the other housing to connect to the second driving gear, and the first driving gear and the second driving gear are adapted to rotate toward a first direction or a second direction when the first motor and the second motor are running in the reverse direction, enabling the first driven gear and the second driven gear to be stationary, thereby driving the driving wheel to rotate toward the first direction or the second direction.

5. The dual-motor differential drive system according to claim 2, wherein the at least one drive unit is a chain or a belt and the driving wheel is a sprocket or a belt pulley.

6. The dual-motor differential drive system according to claim 1, wherein the drive wheel is disposed on one side of the main wheel and surrounds periphery of the central shaft.

7. The dual-motor differential drive system according to claim 1, wherein the drive wheel is disposed on the central shaft and is located in the main wheel, and one end of the drive wheel protrudes outside the main wheel in the axial direction.

8. The dual-motor differential drive system according to claim 2, wherein the first motor and the second motor are disposed on a same side of the differential unit, and the first motor and the second motor are stacked on top of each other.

9. The dual-motor differential drive system according to claim 8, wherein a third shaft penetrates one of the housings to connect to the first driving gear, the second shaft of the second motor penetrates the other housing to connect to the second driving gear, the first shaft is disposed parallel to and above the third shaft and the second shaft, and two interlocking gears are respectively fixedly sleeved on the third shaft and the first shaft, and engaged with each other.

10. The dual-motor differential drive system according to claim 8, wherein a third shaft penetrates one of the housings to connect to the first driving gear, the second shaft of the second motor penetrates the other housing to connect to the second driving gear, the first shaft is disposed parallel to and above the third shaft and the second shaft, two belt pulleys are respectively fixedly sleeved on the third shaft and the first shaft, and the at least one drive unit comprises a belt that is respectively sleeved on the two belt pulleys.

11. The dual-motor differential drive system according to claim 8, wherein a third shafts penetrates one of the housings to connect to the first driving gear, a fourth shaft passes penetrates the other housing to connect to the second driving gear, the first shaft is disposed parallel to and above the fourth shaft, the second shaft is disposed parallel to and below the third shaft and the fourth shaft, and four interlocking gears are respectively fixedly sleeved on the first shaft, the second shaft, the third shaft and the fourth shaft and the gears are engaged in pairs with each other.

12. A dual-motor differential drive system, comprising:
   a main wheel, having two central shafts extending in an axial direction;
   two drive wheels, respectively disposed on the two central shafts;
   a differential unit, disposed inside of the main wheel;
   a first motor and a second motor, in a parallel two-layer disposition; and two drive units, respectively connected to the two drive wheels, and the first motor and the second motor, wherein the first motor and the second motor are adapted to run in reverse direction to respectively drive the two drive wheels through the two drive units, thereby driving the differential unit to rotate, to enable the main wheel to pivot through the two central shafts.

13. The dual-motor differential drive system according to claim 12, wherein the differential unit comprises:

a driving wheel that is aligned with the drive wheel, and the at least one drive unit is sleeved on the driving wheel and the drive wheel;

a first driven gear and a second driven gear that are pivotally connected to inside of the driving wheel and located on a radial direction of the driving wheel, a first driving gear and a second driving gear that are rotatably disposed on an axial direction of the driving wheel and respectively engaged with the first driven gear and the second driven gear; and two housings that are disposed on two sides of the driving wheel and configured to accommodate the first driven gear, the second driven gear, the first driving gear and the second driving gear.

14. The dual-motor differential drive system according to claim 12, further comprising two belt pulleys, respectively disposed on a first shaft of the first motor and a second shaft of the second motor, wherein each of the drive units is sleeved on each of the drive wheels and each of the belt pulleys.

* * * * *